United States Patent [19]

Shapiro et al.

[11] 4,152,320

[45] May 1, 1979

[54] FLAME-RETARDANT, WOOD-BONDING ADHESIVE CONTAINING SULFUR

[75] Inventors: Hymin Shapiro; Robert N. Sanders, both of Baton Rouge, La.

[73] Assignee: Ethyl Corporation, Richmond, Va.

[21] Appl. No.: 768,109

[22] Filed: Feb. 14, 1977

Related U.S. Application Data

[63] Continuation-in-part of Ser. No. 607,131, Aug. 25, 1975, abandoned.

[51] Int. Cl.$^2$ .................... C08G 75/00; C09D 5/14
[52] U.S. Cl. .................... 260/45.85 T; 106/18.18; 156/331; 156/335; 252/8.1; 428/528; 428/529; 428/921; 528/219; 528/254; 528/257
[58] Field of Search ............... 260/45.85 V; 156/335, 156/331, 295, 311; 428/524, 528, 529, 535, 537, 538, 921; 260/29.3, 29.4 R, 48, 59 R, 71, 72 R, 79, 45.75 E, 45.85 T, 16.24, 666 A, 666 PY; 106/15 FP; 252/8.1

[56] References Cited

U.S. PATENT DOCUMENTS

| | | | |
|---|---|---|---|
| 2,287,536 | 6/1942 | Powers | 260/29.3 |
| 2,505,782 | 5/1950 | Meiler et al. | 260/48 |
| 2,859,187 | 11/1958 | Ropella | 428/921 |
| 3,158,588 | 11/1964 | Johnson | 106/15 FP |
| 3,440,064 | 4/1969 | Ludwig | 106/15 FP |
| 3,498,877 | 3/1970 | Christofferson et al. | 156/335 |
| 3,544,492 | 12/1970 | Taylor et al. | 260/4 R |
| 3,556,897 | 1/1971 | Christofferson et al. | 156/335 |
| 3,666,617 | 5/1972 | Marciniak | 106/15 FP |
| 3,734,918 | 5/1973 | Mayer et al. | 156/335 |

OTHER PUBLICATIONS

Ludwig et al., "Fire-Retardant Elemental Sulfur", Journal of Materials, vol. 2, No. 1 ASTM (1967) pp. 131-145.
Taylor et al., "Sulfur Containing Curing Agents for Rubber" Chem. Abstracts, vol. 74 #43329J (1971).
Wiess, Cyclopentadiene and Icyclopentadiene, Kirk-Othmer Ect, vol. 6 pp. 688, 701, 703-704 ®1965.

*Primary Examiner*—John T. Goolkasian
*Assistant Examiner*—J. J. Gallagher
*Attorney, Agent, or Firm*—Donald L. Johnson; John F. Sieberth; James M. Pelton

[57] ABSTRACT

A wood-bonding adhesive containing as the adhesive base sulfur and a synthetic thermosetting urea resin, phenol resin, melamine resin, resorcinol resin and a flame retardant mixture of compounds selected from styrene, maleic acid related materials, dicyclopentadiene and the like. Also, a method of adhesively bonding wood adherends together and an article bonded by the adhesive are disclosed.

8 Claims, No Drawings

FLAME-RETARDANT, WOOD-BONDING ADHESIVE CONTAINING SULFUR

CROSS REFERENCE TO RELATED APPLICATION

This application is a continuation-in-part of our co-pending application Ser. No. 607,131, filed Aug. 25, 1975, now abandoned.

BACKGROUND OF THE INVENTION

The utilization of adhesives and the bonding of wood has its orgin in the early history of man. The first adhesives for bonding wooden articles were those which occurred in nature, for example, glue from animal protein by-products, vegetable starch, caseins, soybeans, blood, blood-albumin and the like. As effective as these adhesives may be—indeed some are still used today—such naturally occurring adhesives do not always provide strengths or properties that will meet present day specifications. This is especially true in the wood industry where bond strength and resistance to moisture is a primary concern. The wood industry, particularly the plywood industry, has turned to the newer synthetic adhesives which are chemically reactive, such as amino or phenolic resins, for example, urea phenol, melamine, resorcinol and the like. Such thermosetting resin adhesives develop bond strength through a chemical reaction in the actual bonding process. Generally speaking, such chemically reactive thermosetting resin adhesives employ a monomer or low molecular weight polymer admixed with a catalyst or an initiator, and which additionally may contain other materials, prior to being spread in liquid form on the adherend surface to be bonded. The joint is formed by applying the other adherend surface, usually under pressure, and allowing the adhesive to "cure". The "curing" is the chemical reaction which progresses whether at room temperature or at some elevated temperature for a period of time sufficient for the chemical reaction to go essentially to completion. The synthetic thermosetting resins which are chemically reactive adhesives suffer from the disadvantages of greater cost than naturally occurring adhesives, limited shelf and liquid pot lives when prepared for use, the length of life depending on the ratio of catalyst to resin and temperatures at which the adhesives are stored or used. Another disadvantage which is especially true in the plywood industry is that the chemically reactive synthetic resin adhesives have relatively long "curing" times. This disadvantage is especially troublesome because the press-curing in the manufacture of plywood is recognized as a natural bottleneck in a well designed plant for continuous plywood manufacture. Curing temperatures from 80°–140° C. are used, depending on the type and application of the plywood, for periods of 5–10 minutes under pressures chosen to bring about compaction, i.e., all plies being brought into intimate contact, and, above that, 4 percent compression.

Our recently issued U.S. Pat. No. 3,855,054 teaches an article and process for bonding two wood adherend surfaces together with an adhesive having a high bond strength, high resistance to moisture and relatively short "curing" time. The adhesive described is solidified sulfur which may additionally contain conventional fillers such as wood flour, sawdust, fine sand, fly ash, inert clays, metallic filings, wools or powders, pigments, such as iron oxide, calcium chromate and barium chromate and up to 25 weight percent plasticizers, such as polyethylene tetrasulfide, polydiacetic tetrasulfide, dimercaptobutane, diallyl tetrasulfide, mercaptoethylene and cyclohexane thiols. Wood bonded with the sulfur adhesives of our U.S. Pat. No. 3,855,054 patent has, in addition to short curing time, resistance to moisture. However, conventional applicator equipment cannot be used as it is applied in powder or stiff paste form.

THE INVENTION

In accordance with the present invention, an adhesive has been discovered which has many of the advantages of the chemically reactive thermosetting resin adhesives, but which has a shorter curing time and greater resistance to bond strength errosion by moisture contact and which can be applied using conventional technology. Further, in accordance with the present invention, the adhesive provided will be more cost effective than the conventional synthetic resin adhesives. Still further, the present invention provides an adhesive which is more fire retardant than conventional adhesives or the sulfur adhesives of our U.S. Pat. No. 3,855,054.

In accordance with the present invention, there is provided a cost effective, fire retardant, wood-binding adhesive composition containing as the binder thereof from about 30 to about 60 weight percent of sulfur; from about 70 to about 40 weight percent of a synthetic thermosetting resin selected from urea resins, melamine resins, phenol resins, resorcinol resins and mixtures of these and as the fire retardant component from about 1 to about 5 weight percent based on the total adhesive weight of a mixture of dicyclopentadiene, styrene and a member of the group consisting of maleic acid; alkyl mono- and diesters of maleic, fumaric and phthalic acid having from 4 to about 8 carbon atoms in each alkyl group; brominated styrene; and triphenyl phosphate or methyl-substituted triphenyl phosphate having from 1 to 3 methyl groups attached to the phenyl ring.

Also, the present invention includes a method of adhesively bonding at least two wood adherends using the adhesive composition hereinabove mentioned and including the steps of (a) contacting said adherend surfaces to be bonded, at least one of which has the adhesive applied to at least a portion thereof, under sufficient pressure to form a joint; (b) heating said joint to a temperature of about 112° to about 150° C. for a time sufficient to cure the synthetic resin adhesive binder and to melt the sulfur; and (c) cooling the joint to solidify the sulfur whereby an effective bond is formed. An additional aspect of the present invention provides an article of manufacture in which at least a portion of a wood adherend surface is bonded to at least a portion of a second adherend surface, usually also a wood adherend, by means of a cost effective, fire retardant adhesive hereinabove mentioned.

In the present invention, the mixed adhesive composition and process or method for adhesively bonding two wood adherends may employ any suitable wood adhered surface. Exemplary of the wood adherend surfaces which may be utilized for the purposes of this invention are soft woods and hard woods. Typical of the soft woods are Douglas fir, southern pine, hemlock, western red cedar, Noble fir, white fir, redwood, spruce and the like. Typical hard woods useful in this invention are birch, maple, cherry, walnut, oak, poplar, gum, basswood, mahogany, lauan, beech, ash, hickory, elm, sycamore, linden, chestnut, teak, and the like.

The sulfur which forms a part of the mixed adhesive composition of this invention may be utilized in either liquid, e.g., molten, or solid form, preferably in a finely divided or powdered state. For use in this invention, element sulfur of commercial purity in either amorphous form or any crystalline solid form is preferred because of its ease of handling and ability to mix with the resin prior to adding the catalyst. From about 30 to about 60 percent sulfur may be used in the total amount of adhesive binder. Preferably, 40 to 50 l weight percent can be employed. Although amounts greater than 60 percent of sulfur can be used, the adhesive composition would be too stiff a paste to use conventional applicator equipment. At less than 30 percent, the adhesive properties depend mainly on the conventional thermosetting resins and the sulfur would not contribute significantly to adhesive cost effectiveness or moisture resistance. Smaller amounts of sulfur may be used; however, at 5 percent or less, the sulfur could be considered as a filler in the conventional thermosetting resin adhesive compositions.

The synthetic thermosetting resins which may be employed in this invention in combination with sulfur are those known in the art and conventionally used in the plywood industry such as amino or phenolic resins, for example, urea, phenol, resorcinol and melamine resins. The urea or phenol resins are preferred and, in general, a monomer or low molecular weight polymer, usually with formaldehyde or a formaldehyde donor, such as solid paraform, can be used to prepare the monomer or low molecular weight polymer of the synthetic thermosetting resin component. Mixtures of such amino or phenolic resins such as urea-melamine resins, phenol-resorcinol resins, or all of these can be made for specific applications. In general, the melamine and phenolic resins add additional moisture protection to the less expensive urea resins. Thus, in the present invention, the synthetic thermosetting resin can be selected from urea resins, phenol resins, melamine resins or resorcinol resins or mixtures of these. Particularly preferred synthetic thermosetting resin mixtures are urea-melamine resins and urea-phenol resins because such mixtures represent a balance of cost and property advantages which are not obtainable from any single resin. Different mole ratios of the amino or phenolic component to formaldehyde are available in the wood industry for different applications. For example, depending on the curing temperature and pot life desired, the mole ratio of such amino or phenolic component to formaldehyde can vary from 1:1 to 1.5:1. In addition, the solids content in aqueous dispersion formulations can be varied depending on the consistency of the resin desired. Spray-dried powder forms of resin are also conveniently usable. Typical formulations include mixing of water, fillers, and resin followed by addition of the catalyst just before use so that premature curing of the synthetic thermosetting resin is not effected.

The mixed adhesive of this invention also contains, as a preferred fire retardant, a mixture of styrene, maleic acid and dicyclopentadiene. Although styrene and maleic acid are known as fire retardants for sulfur, so far as is known the mixture has not heretofore been considered as a fire retardant component for a wood-bonding adhesive either per se or in further combination with dicyclopentadiene. The fire retardant effectiveness of styrene and various other additives, notable among which is maleic acid, is discussed by Ludwig and Dale, "Journal of Materials", Vol. 2, No. 1, American Society for Testing and Materials (1967), pp. 131–145, which is hereby incorporated by reference as if fully set forth herein. It is noteworthy that the phenomenon is unexplained by the authors and indeed appears to be contrary to what the artisan would expect. Further, nothing in Ludwig and Dale anywhere indicates that in combination with conventional synthetic thermosetting resins that adhesive qualities would remain acceptable while the fire retardant properties of the total mixed adhesive would be enhanced.

The amount of fire retardant components which are employed can range from about 1 to about 5 weight percent of the total adhesive mixture; preferably from about 3 to about 5 weight percent of the fire retardant mixture can be used. Typically the adhesive composition can contain the following percentages of the various components:

|  | Wt. % |
| --- | --- |
| Synthetic thermosetting resin | 47.5 |
| Sulfur | 47.5 |
| Styrene | 1.5 |
| Maleic acid | 1.5 |
| Dicyclopentadiene | 2.0 |
| Total | 100.0 |

Various formulations would certainly occur to skilled artisans from Table 1 of Ludwig and Dale, supra, in combination with resin, sulfur and dicyclopentadiene and these are included within the scope of our invention.

Thus, as the fire retardant component of the present mixed adhesive composition one can employ a mixture of styrene and dicyclopentadiene with maleic acid or related compounds, such as alkyl mono- or diesters of maleic, fumaric or phthalic acid having from 4 to about 8 carbon atoms in the alkyl group. For example, maleic acid itself can be employed and is preferred because of its ready availability and low cost, but dioctyl maleate, monobutyl maleate, dibutyl fumarate, diiso-decyl phthalate, di-n-butyl phthalate, diiso-octyl phthalate, dibutyl maleate, fumaric acid, phthalic acid, maleic anhydride, phthalic anhydride and the like, as is more extensively stated in Ludwig and Dale, supra, can be employed. Additionally, the combination of styrene and dicyclopentadiene with a triphenyl phosphate or a methyl-substituted triphenyl phosphate having from 1 to 3 methyl groups attached to the phenyl ring such as, for example, tricresyl phosphate can also be employed. It should also be recognized, as again more extensively treated in Ludwig and Dale, supra, that other phosphorus-containing and commercially available fire retardants may be useful as a component in the adhesive of our invention. As a still further component of the fire retardant mixture there can be mixed dicyclopentadiene, styrene and a hydrocarbon or halogenated hydrocarbon, typical of which are brominated styrene, various mixtures of chlorinated paraffin waxes, p-dichlorobenzene, α,α,α-trichlorotoluene, xylene and the like, as more extensively stated in Lugwig and Dale, supra.

When sulfur is employed at about 30 to about 60 percent by weight, based on the total amount of the mixed adhesive composition of the present invention, the adhesive formulation prior to curing is a pumpable liquid dispersion or pasty mass but does not remain so for extended periods. Application of the mixed adhesive composition of this invention can therefore be conducted in accordance with conventional applicator techniques such as conventional glue spreader machines which have a series of rubber-covered grooved applicator rolls which apply the adhesive to the surface of the adherend. The amount of adhesive applied per unit area is controlled by the number of grooves per linear inch of the length of the roll, the depth of the grooves, and the viscosity of the adhesive. Assembly of individual adherends to form a joint, or in the plywood industry the assembly of the veneers into plywood, for example, can then employ conventional methods.

Curing of the assembled joint or stack of veneers is carried out under heat and pressure for a time sufficient to effect a suitable bond. In general, the temperature of the curing must be sufficient to melt the sulfur in the mixed adhesive composition. Sulfur melts at about 160° C. and the cure temperature should not be less than this in order to obtain adequate bonding between the sulfur in the adhesive and the wood adherend. It is believed that sulfur and thermosetting resin would chemically react to form sufficient bonds at less than the melting point of sulfur. However, the sulfur would not form sufficiently strong bonds with wood at temperatures below about 107° C. Preferably, the curing temperature should be in excess of the melting point of sulfur, typically, about 112° C. but not in great excess of about 200° C. A preferred temperature range for curing the mixed adhesive of this invention is from about 112° to about 150° C., as as to insure that the adhesive is sufficiently hot to quickly melt the sulfur and allow sufficient time to contact the adherend surfaces to be bonded before solidification of the sulfur and curing of the thermosetting resin. The temperature should not be so high as to produce substantial formation of polymerized sulfur or to damage the adherend surfaces.

Once the adhesive is applied to the adherend surfaces to be bonded, the surfaces are contacted under sufficient pressure to form a joint. The pressures normally used in press-curing plywood are sufficient for purposes of the present invention. That is, the joint or adherend surfaces are brought into intimate contact by appropriate means, such as loading with weight, clamping, pressure rolling or pressing with various screw or hydraulic presses so as to bring about compaction and, above that, about 4 percent compression. In general, the adhesive contact should be maintained until the molten sulfur has solidified. The pressure should be sufficient to exclude bubbles and entraped air or gases generated on curing of the synthetic resin adhesive. For example, pressures from about 0.1 up to about 1000 psig or greater may be utilized. However, care should be taken not to exceed the pressure which will have a damaging effect on the adherends. The use of thin wood veneers as adherends in the plywood industry generally employ pressures from about 25 to about 90 psig. Conventional means for maintaining pressure on the assembled joint can be used for the purposes of this invention and are well known to those skilled in the art.

The assembled joint is maintained under heat and pressure for a time sufficient to cure the adhesive. In the case of the mixed adhesive of the present invention, curing is considered to be the time for the synthetic resin adhesive to sufficiently cross-link to form a polymer of sufficient molecular weight to bond the adherends together and for the sulfur to melt and flow together with the synthetic resin adhesive and then solidify forming the adhesive bond between the two adherend surfaces. The time for the synthetic resin adhesive to cure depends on the temperature. For typical urea-formaldehyde resin formulations, curing from 110° to 127° C. for 8 minutes in a 3/16 inch thick panel is used. In accord with the present invention, the period of time required only depends on the time that it takes molten sulfur adhesive to substantially solidify. This period of time will depend on the amount of cooling that can be brought to bear on the assembled joint. Thus, depending on the available cooling means, the heat transfer coefficients for the adherends and the number of adherends bonded together, periods from 8 minutes to 1½ minutes can be used. Typically in conventional plywood applications a typical urea-formaldehyde resin adhesive formulation for bonding hardwood plywood includes 100 parts by weight of wheat flour, 100 parts water, 100 parts urea-formaldehyde spray-dried resin, 0.5 parts of ammonium chloride, and an additional 55 parts of water. Increasing the ammonium chloride catalyst content to 2.5 parts permits curing at room temperature. The amount of catalyst employed determines the normal curing temperature for a particular thermosetting resin. Typical phenol-formaldehyde resin adhesives can be used as conventionally formulated for bonding hardwood or softwood plywood for exterior use. Such phenol resins may be used in liquid form dispersed in water and used without additional catalyst or hardeners. Such formulations are disclosed in U.S. Pat. No. 2,360,376 and U.S. Pat. No. Re. 23,347, which are incorporated herein by reference as fully set forth. As indicated with the sulfur adhesive taught in our U.S. Pat. No. 3,855,054, the basic resin formulations for the synthetic thermosetting resins may be extended with dry soluble whole blood, ground wood, bark fractions, or residues from furfural hydrolysis of agricultural materials. Use of extenders in the synthetic thermosetting resin adhesives may require adjustment of curing temperatures and times which can be determined experimentally.

The mixed adhesive of the present invention may contain various additives such as fillers, plasticizers, pigments, hardeners, catalysts and the like. Exemplary of fillers which may be utilized in the adhesive of this invention are wood flour, sawdust, fine sand, fly ash, various fine inert clays and the like. Fillers may be present up to an amount of about 60 weight percent based on the total amount of the adhesive composition. Fillers having high heat capacity such as metallic filings, metallic wools or powders, etc., may be used to enhance the flame resistance of the flame retardant treatment provided by our invention. Plasticizers which may be used to render the sulfur portion of the mixed adhesive of this invention more plastic are polyethylene tetrasulfide, polydiacetic tetrasulfide, dimercaptobutane, diallyl tetrasulfide (mercaptoethylene)cyclohexanethiols and the like. Up to about 25 weight percent of plasticizers may be present in the mixed adhesive of the present invention based on the total weight of the adhesive composition. Pigments such as iron oxide, calcium chromate, barium chromate and the like, including organic pigments may be present in amounts up to about 25 weight percent based on total weight of the adhesive composition to overcome the color of the synthetic resin adhesive or to mask the characteristic yellow color of the sulfur. It is clear that the various fillers, plasticizers and additives which may be used can be employed either individually or in combination. Further, conventional catalysts for the synthetic thermosetting resin adhesives, such as ammonium chloride, hereinabove indicated, or alkali metal hydroxide may be used to promote the curing of the synthetic resin component of the mixed adhesive of this invention. In the curing or cross-linking, for example, of a urea-formaldehyde adhesive, the hydrogen (oxonium) ion is the actual catalyst but it is released gradually from the secondary reaction between, for example, ammonium chloride and free formaldehyde in the resin, to produce hexamethylenetetramine and hydrochloric acid. If free hydrochloric acid were added directly to the resin before spreading, the hardening or curing reaction would be so fast that the adhesive would gel before it could be spread. The indirect reaction is, therefore, conveniently used. Buffers or catalyst retarders such as ammonia or calcium phosphate may be added to control the acidity and thus the curing reaction.

The mixed adhesive composition of the present invention may be formulated by conventional solids or solid-liquid mixing procedures in which a spray-dried urea or phenol-formaldehyde powder can be mixed with sulfur powder and the fire retardant mixture, followed by addition of water and catalyst and then the mixture can be applied to a surface to be bonded. Alternately, the synthetic thermosetting resin can be of a type for mixing only with water to which is added a sulfur powder produced by melting the sulfur powder and mixing with the fire retardant mixture, quick-cooling and grinding to a powder. In another mode, the synthetic thermosetting resin can be completely formulated and ready for application to the adherend surface and then sulfur-fire retardant powder mixture can be combined with the formulation in the desired amount. Further, the sulfur does not require addition in solid form to the liquid synthetic thermosetting resin formulation but the sulfur can be heated to melting and either added to the synthetic thermosetting resin adhesive formulation or the synthetic thermosetting resin formulation can be added to molten sulfur. The use of molten sulfur, that is, at temperatures greater than about 112° C., is a more complex operation and requires greater care and control of the temperatures in order to avoid precuring the synthetic thermosetting resin adhesive. Therefore, it is preferred to mix the sulfur-fire retardant powder mixture with the synthetic resin adhesive formulation either before or after addition of the catalyst or without catalyst addition if the premixed type is used. Further, the amount of thermosetting resin and the amounts of fillers, plasticizers or other ingredients will also effect the curing time of the resultant adhesive composition.

To achieve the highest bond strength, the preferred minimum amount of the mixed adhesive of this invention to be applied to an adherend surface would be that amount which is sufficient to substantially cover both of the adherend surfaces to be bonded upon contact of these surfaces with the adhesive composition. Coverage of at least a portion of the adherend surfaces, which are exclusive of the joint surfaces, is permissible and in some cases may be preferable for decorative purposes, weather-proofing purposes, sealing purposes, protective purposes and the like. For example, it may be desirable to completely cover all surfaces of the adherends even though the joint surfaces will be a small portion of the totality of adhesive covered surfaces for sealing the adherends completely from the atmosphere or environment.

Articles may be produced in accordance with the present invention which have many valuable applications, for example, the adhesive composition, process and articles may be utilized in the plywood industry to apply wood veneers on wood surfaces, to form wood structural products such as furniture and laminated beams, and for repair of broken wood objects, for wooden construction forms useful in concrete work, and for similar purposes. The advantage of the present invention resides in the use of a much more cost effective adhesive binder, i.e., sulfur, and in the combination of such conventional synthetic thermosetting resin adhesives and sulfur with a fire retardant mixture of styrene, maleic acid and dicyclopendtadiene to obtain a more fire resistant product which also cures in a much shorter time. Certainly, the articles and processes of the present invention can be utilized to manufacture bonded articles containing more than two adherend surfaces. For example, in utilization in the plywood industry at least three adherend bond surfaces are involved and usually five veneers are assembled with cross band grain directions of the plywood panel. Of course, any grade or number of plywood veneers can be utilized in producing articles in accord with this invention. Thus, interior or exterior plywood panels, marine plywood, and even structural laminated beams may be produced in accord with the present invention.

The adhesive composition, articles and processes in accord with this invention can be illustrated in the following non-limiting examples. In the following examples, all parts and percentages are by weight unless otherwise specified.

EXAMPLE 1

A mixed adhesive according to this invention was prepared by melting in a flat bottomed flask 100 parts of sulfur to which was added 3 parts of styrene and 3 parts of maleic acid. After addition, the mixture was stirred and then quick cooled to provide a crystalline sulfur powder after grinding. Several previous attempts to combine these ingredients in a stoppered flask resulted in the pressure popping the stopper or the build-up of pressure until the danger of exploding the flask required the release of the stopper. Then 62.4 parts of a commercially available Weldwood Plastic Resin Glue, identified as a phenolformaldehyde resin, had 37.4 parts of water added and a thin paste was made. The sulfur powder containing styrene and maleic acid was then added to the paste along with 4.2 parts of dicyclopentadiene. After thorough mixing in not more than 2 minutes the pasty mass was spread on 3"×5"×⅛" pine test plaques and assembled into a 4-ply stack. The assembled stack was placed in a press and loaded to 667 psig over a 10-minute period with the temperature of the press platen faces being held at 270° F. (132.5° C.). The pressure eased off over a period of 10 minutes to 400 psig at which the pressure was maintained for another 10 minutes. During the pressing, sulfur was observed to melt and flow out between the plies. Finally, the pressure was released and the plywood sample cooled to ambient conditions. Penknife-type testing revealed fracturing in the wood phase. Therefore, strength of the ply bonding was judged equivalent to conventional plywood.

The test plywood specimen produced above was burned in the following manner to assess fire retardance. The specimen was placed horizontally on supports spaced 4½" apart. A steel rod, 1½" in diameter and weighing aboaut 14.2 pounds, was rested on top of the specimen at its center and vertically supported by a series of rings. A gas burner protruding at an angle of 45° through one of the specimen supports was adjusted through a needle valve and controlled through an on-off valve so that the inner cone of the flame just touched the specimen directly beneath the vertical rod. The needle valve was not thereafter adjusted. Time was measured from the ignition of the burner until the rod broke through the specimen.

In the specimen prepared above, the result was a burning time of 537 seconds until breakthrough.

The Table below indicates the burning times for several specimens prepared in accord with the procedure of Example 1, except the adhesive differs as noted. In the Table, all percentages are by weight and "glue" refers to the same Weldwood Plastic Resin Glue employed in Example 1.

TABLE 1

| Example No. | Specimen % (4-ply 3"×5"×⅛" each ply) | Burning Time (sec.) |
| --- | --- | --- |
| 1 | 47.5 sulfur<br>47.5 glue<br>1.5 styrene<br>1.5 maleic acid<br>2 dicyclopentadiene | 537 |
| 2 | 100 glue | 443 |
| 3 | 49.5 sulfur<br>49.5 glue<br>1 decabromodicyclopentadiene | 418 |
| 4 | 49.5 sulfur<br>49.5 glue<br>1 dicyclopentadiene | 405 |
| 5 | No adhesive (4 plys stacked together) | 390 |
| 6 | 50 sulfur<br>50 glue | 362 |

Thus, from the results given above, the mixed adhesive of this invention has a burning time 48% greater than the combination of sulfur and glue alone (Ex. No. 6) and about 24% greater than the commercially available synthetic resin adhesive along (Ex. No. 2).

The foregoing examples can be repeated except that the phenol-formaldehyde resin adhesive can be replaced with urea, resorcinol or melamine resins or mixtures of any of the foregoing resins with phenol with similar results to form adhesives and articles of the present invention.

From the foregoing examples, it is clear that the mixed adhesive process for bonding wood adherends using the mixed adhesives and articles produced thereby have utility and strength equal to or better than commercially prepared synthetic thermosetting resins and much improved fire retardance. One skilled in the art can envision various changes in the present invention which are within the spirit and scope of the foregoing disclosure. Therefore, it is desired that the present invention be limited only by the scope of the following claims.

What is claimed is:

1. A cost effective, fire retardant, plywood adhesive composition containing as the binder thereof from about 30 to about 60 weight percent of sulfur and from about 70 to about 40 weight percent of a synthetic thermosetting resin selected from urea resins, melamine resins, phenol resins, resorcinol resins and mixtures of these and as the fire retardant component from about 1 to about 5 weight percent based on the total adhesive weight of a mixture of dicyclopentadiene, styrene and a member of the group consisting of maleic acid; alkyl mono- and diesters of maleic, fumaric and phthalic acid having from 4 to about 8 carbon atoms in each alkyl group; brominated styrene; and triphenyl phosphate or methyl-substituted triphenyl phosphate having from 1 to 3 methyl groups attached to the phenyl ring.

2. The composition of claim 1 wherein said synthetic thermosetting resin is a urea resin.

3. The composition of claim 1 wherein said synthetic thermosetting resin is a phenol resin.

4. The composition of claim 1 wherein said synthetic thermosetting resin is a melamine resin.

5. The composition of claim 1 wherein said synthetic thermosetting resin is a resorcinol resin.

6. The composition of claim 1 wherein said synthetic thermosetting resin is a urea-melamine resin.

7. The composition of claim 1 wherein said synthetic thermosetting resin is a urea-phenol resin.

8. The composition of claim 1 wherein said adhesive contains from 40 to 50 weight percent sulfur and from 60 to 50 weight percent of synthetic thermosetting resin selected from urea resin, melamine resin, phenol resin and resorcinol resin.

* * * * *